(12) United States Patent
Clifford et al.

(10) Patent No.: US 8,545,977 B2
(45) Date of Patent: Oct. 1, 2013

(54) POLYMER CONCRETE ELECTRICAL INSULATION

(75) Inventors: Stephen Clifford, Bremgarten (CH); Faustine Soyeux, Luneville (FR); Andrej Krivda, Wettingen (CH); Vincent Tilliette, Zurich (CH); Nikolaus Zant, Zurich (CH); Bandeep Singh, Wytheville, VA (US); Felix Greuter, Baden-Ruetihof (CH); Leopold Ritzer, Untersiggenthal (CH)

(73) Assignee: ABB Research Ltd., Zurich (CH)

( * ) Notice: Subject to any disclaimer, the term of this patent is extended or adjusted under 35 U.S.C. 154(b) by 221 days.

(21) Appl. No.: 12/756,464

(22) Filed: Apr. 8, 2010

(65) Prior Publication Data

US 2010/0227951 A1 Sep. 9, 2010

Related U.S. Application Data

(63) Continuation of application No. PCT/EP2007/060633, filed on Oct. 8, 2007.

(51) Int. Cl.
| | |
|---|---|
| H01B 3/02 | (2006.01) |
| H01B 3/08 | (2006.01) |
| H01B 3/10 | (2006.01) |
| C08G 59/20 | (2006.01) |
| C08K 3/10 | (2006.01) |
| C08K 3/14 | (2006.01) |
| C08K 3/20 | (2006.01) |
| C08K 3/22 | (2006.01) |
| C08K 3/28 | (2006.01) |
| C08K 3/34 | (2006.01) |
| C08K 3/36 | (2006.01) |
| C08K 3/38 | (2006.01) |

(52) U.S. Cl.
USPC ........... 428/331; 428/323; 428/325; 428/328; 428/329; 428/339; 523/440; 523/442; 523/443; 523/444; 523/445; 523/457; 523/458; 523/466

(58) Field of Classification Search
None
See application file for complete search history.

(56) References Cited

U.S. PATENT DOCUMENTS

| | | | | |
|---|---|---|---|---|
| 3,407,165 A | * | 10/1968 | Loois et al. | 523/219 |
| 4,009,141 A | | 2/1977 | Nichols et al. | |
| 4,102,851 A | | 7/1978 | Luck et al. | |
| 4,210,774 A | | 7/1980 | Perry | |
| 6,638,567 B1 | | 10/2003 | Beisele | |
| 2004/0092654 A1 | * | 5/2004 | Jennrich et al. | 524/588 |
| 2006/0188727 A1 | * | 8/2006 | Ito et al. | 428/413 |
| 2007/0097651 A1 | * | 5/2007 | Canale et al. | 361/704 |
| 2007/0148467 A1 | * | 6/2007 | St. Lawrence et al. | 428/411.1 |

FOREIGN PATENT DOCUMENTS

| | | |
|---|---|---|
| WO | WO 00/55254 A1 | 9/2000 |

OTHER PUBLICATIONS

International Search Report for PCT/EP2007/060633 completed Jul. 2, 2008.
Written Opinion for PCT/EP2007/060633 completed Jul. 2, 2008.

* cited by examiner

*Primary Examiner* — Michael J Feely
(74) *Attorney, Agent, or Firm* — Buchanan Ingersoll & Rooney PC

(57) ABSTRACT

Polymer concrete electrical insulation including a hardened epoxy resin composition filled with an electrically non-conductive inorganic filler compositions. The polymer concrete electrical insulation system optionally may contain additives. The epoxy resin composition is based on a cycloaliphatic epoxy resin. The inorganic filler composition can be present within the range of about 76% by weight to about 86% by weight, calculated to the total weight of the polymer concrete electrical insulation system. The inorganic filler composition includes a uniform mixture of (i) an inorganic filler with an average grain size within the range of 1 micron (μm) to 100 micron (μm) [component c(i)], and (ii) an inorganic filler with an average grain size within the range of 0.1 mm (100 micron) to 2 mm [component c(ii)]. The inorganic filler with an average grain size within the range of 1 micron (μm) to 100 micron (μm) [component c(i)] can be present in an amount within the range of 22% to 42%, calculated to the total weight of the polymer concrete electrical insulation system; and (e) the inorganic filler with an average grain size within the range of 0.1 mm to 2 mm [component c(ii)] is present within the range of 41% to 61% by weight, calculated to the total weight of the polymer concrete electrical insulation; and method of producing said electrical insulation.

12 Claims, No Drawings

POLYMER CONCRETE ELECTRICAL INSULATION

RELATED APPLICATIONS

This application claims priority as a continuation application under 35 U.S.C. §120 to PCT/EP2007/060633 filed as an International Application on Oct. 8, 2007 designating the U.S., the entire content of which is hereby incorporated by reference in its entirety.

FIELD

The present disclosure refers to a polymer concrete electrical insulation system based on hardened epoxy resin compositions.

BACKGROUND INFORMATION

Polymer concrete is a composite material which is based on a polymer containing a high amount of filler material, being a highly filled system with a minimum amount of an organic binder. Polymer concrete composite materials can be used in indoor and outdoor applications, for example, as electrical insulation systems in various electrical installations.

Polymer concrete is distinct from the generally used electrical insulation systems based on hardened epoxy resin compositions by its comparatively high filler content. Electrical insulation systems based on hardened epoxy resin compositions can, for example, be filled to about 65% by weight with filler material, for example with silica particles, wherein the average particle size distribution of the silica can be within the range of from 1 micron (μm) to 100 micron (μm), corresponding to an average particle size distribution of $10^{-3}$ mm to $10^{-1}$ mm. Polymer concretes can, for example, be filled to about 80% by weight or more with an aggregate of different filler sizes. It is this high filler content which gives the low material costs since the filler can generally be less than a third of the price of the polymeric component, for the same weight.

A filler content of about 65% in epoxy insulation systems can be the maximum amount of filler that is reasonably processable using a single filler particle size and yielding a non-porous material. Polymer concrete uses an aggregate of filler particle sizes to achieve higher filler contents whilst still yielding a non-porous material. U.S. Pat. No. 4,210,774 discloses an electrical insulation system formed of a polymer binder highly filled with graded inorganic filler particles, including an excess of 85% of such filler particles and wherein the polymer used can include methyl methacrylate. U.S. Pat. No. 4,210,774 states that epoxy resin systems are employed at lower filling levels and that epoxy resins are not suitable for the high filling levels disclosed in U.S. Pat. No. 4,210,774 because of the high viscosity and cost without providing corresponding dielectric strength (col. 5, lines 26f).

Known processing methods for polymer concrete materials can be unsuitable for the high volume manufacture of complex geometries and insert arrangements. For example, the rapid wear of flexible molds can preclude the careful control of surface quality and dimensions of the final part. At best they can be suited to the manufacture of simple insulators in applications where these properties are less of a concern.

SUMMARY

A polymer concrete electrical insulation is disclosed which includes: a hardened epoxy resin composition filled with an electrically non-conductive inorganic filler composition. The epoxy resin composition can be based on a cycloaliphatic epoxy resin. The inorganic filler composition can be present within a range of about 76% by weight to about 86% by weight, calculated to a total weight of the polymer concrete electrical insulation. The inorganic filler composition can include a uniform mixture of (i) an inorganic filler with an average grain size within a range of 1 micron (μm) to 100 micron (μm) [component c(i)], and (ii) an inorganic filler with an average grain size within a range of 0.1 mm (100 micron) to 2 mm [component c(ii)]. The inorganic filler with an average grain size within the range of 1 micron (μm) to 100 micron (μm) [component c(i)] can be present in an amount within a range of 22% to 42%, calculated to the total weight of the polymer concrete electrical insulation. The inorganic filler with an average grain size within the range of 0.1 mm to 2 mm [component c(ii)] can be present within a range of 41% to 61% by weight, calculated to the total weight of the polymer concrete electrical insulation.

A method of producing a polymer concrete electrical insulation is disclosed having an electrically non-conductive inorganic filler composition, the epoxy resin composition being based on a cycloaliphatic epoxy resin, the inorganic filler composition being present within a range of about 76% by weight to about 86% by weight, calculated to a total weight of the polymer concrete electrical insulation system, the inorganic filler composition including a uniform mixture of (i) an inorganic filler with an average grain size within a range of 1 micron (μm) to 100 micron (μm) [component c(i)], and (ii) an inorganic filler with an average grain size within a range of 0.1 mm (100 micron) to 2 mm [component c(ii)], the inorganic filler with an average grain size within the range of 1 micron (μm) to 100 micron (μm) [component c(i)] being present in an amount within a range of 22% to 42%, calculated to the total weight of the polymer concrete electrical insulation, and the inorganic filler with an average grain size within the range of 0.1 mm to 2 mm [component c(ii)] being present within a range of 41% to 61% by weight, calculated to the total weight of the polymer concrete electrical insulation, the method comprising: (i) incorporating the filler material into monomeric starting materials of the epoxy resin composition to be uniformly dispersed therein; adding additives; mixing components at about room temperature until filler granules are wetted and air is removed; processing a resulting non-hardened epoxy resin composition into a desired shape; and curing the epoxy resin composition.

An electrical article can include an polymer concrete electrical insulation.

DETAILED DESCRIPTION

It has surprisingly been found that a polymer concrete electrical insulation based on hardened epoxy resin compositions can be produced by filling an epoxy resin compositions with selected inorganic filler compositions, to a degree of about 76% by weight to about 86% by weight, calculated to the weight of the total epoxy resin composition, when cycloaliphatic epoxy resins and recently commercially available hydrophobic cycloaliphatic epoxy resins can be used as basic polymer binder components.

Exemplary compositions according to the present disclosure can be processed by automated pressure gelation (APG) processes. This type of process involves injection of the epoxy into a metallic mould mounted on a heated press. It is ideally suited to the high volume manufacture of both simple and complex parts, offering precisely controlled surface quality and final part dimensions.

The present disclosure therefore also provides a exemplary processing method for an exemplary epoxy resin composition containing a high amount of filler material to be automated and to be used to produce parts with carefully controlled surface quality and part dimension. The resulting insulation material has an arc resistance time of 240-255 seconds compared with 180-195 seconds for the 65% filled cycloaliphatic epoxy (ASTM D495). Likewise, the exemplary polymer concrete according to the present disclosure passes the 4.5 kV class by the inclined plane tracking and erosion test (IEC 60587) while the 65% filled cycloaliphatic epoxy fails.

The present disclosure provides an exemplary polymer concrete electrical insulation including a hardened epoxy resin composition filled with an electrically non-conductive inorganic filler compositions. The exemplary polymer concrete electrical insulation optionally may contain further additives:.

The epoxy resin composition can be based on a cycloaliphatic epoxy resin. The inorganic filler composition can be present within the range of about 76% by weight to about 86% by weight, calculated to the total weight of the polymer concrete electrical insulation. The inorganic filler composition can include a uniform mixture of (i) an inorganic filler with an average grain size within the range of 1 micron (μm) to 100 micron (μm) [component c(i)], and (ii) an inorganic filler with an average grain size within the range of 0.1 mm (100 micron) to 2 mm [component c(ii)]. The inorganic filler with an average grain size within the range of 1 micron (μm) to 100 micron (μm) [component c(i)] can be present in an amount within the range of 22% to 42%, calculated to the total weight of the polymer concrete electrical insulation. The inorganic filler with an average grain size within the range of 0.1 mm to 2 mm [component c(ii)] can be present within the range of 41% to 61% by weight, calculated to the total weight of the polymer concrete electrical insulation.

The present disclosure further relates to an exemplary method of producing the exemplary polymer concrete electrical insulation. The present disclosure further relates to use of the exemplary polymer concrete electrical insulation system as an electrical insulation in electrical articles. The present disclosure further refers to the electrical articles including the exemplary polymer concrete electrical insulation as an electrical insulation system.

As optional additives, the exemplary polymer concrete electrical insulation system may further include components selected from wetting/dispersing agents, flexibilizers, plasticizers, antioxidants, light absorbers, silicones, pigments, flame retardants and fibers and from further additives generally used in electrical applications.

The uncured epoxy resin composition as used in the present disclosure can, for example, be made from a cycloaliphatic epoxy resin compound and generally contains further a hardener as well as a curing agent to accelerate the curing process. These compounds are known per se. Cycloaliphatic epoxy resin compounds as used within the scope of the present disclosure can contain at least two 1,2-epoxy groups per molecule.

Cycloaliphatic epoxy resin compounds useful for the present disclosure include unsubstituted glycidyl groups and/or glycidyl groups substituted with methyl groups. These glycidyl compounds can have an epoxy value (equiv./kg) preferably of at least three, preferably at least four and especially of about five or higher, preferably about 5.0 to 6.1. Preferred can be, for example, optionally substituted epoxy resins of formula (I):

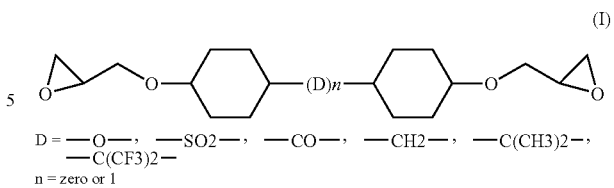

$D = -O-, -SO2-, -CO-, -CH2-, -C(CH3)2-, -C(CF3)2-$ n = zero or 1

Compounds of formula (I) wherein D is —(CH$_2$)— or [—C(CH$_3$)$_2$—] are preferred. Further cycloaliphatic epoxy resins to be used within the scope of the present disclosure further can be for example hexahydro-o-phthalic acid-bis-glycidyl-ester, hexahydro-m-phthalic acid-bis-glycidyl ester or hexahydro-p-phthalic acid-bis-glycidyl ester. Preferred cycloaliphatic epoxy resin compounds can be liquid at room temperature or when heated to a temperature of up to about 65° C. Preferred cycloaliphatic epoxy resin compounds can be for example Araldite® CY 184 (Huntsman Advanced Materials Ltd.), a cycloaliphatic epoxy resin compound (diglycidylester) having an epoxy content of 5.80-6.10 (equiv/kg) or Araldite® CY 5622 (Huntsman Advanced Materials Ltd.), a modified epoxy resin compound (diglycidylester) having an epoxy content of 5.80-6.10 (equiv/kg). Araldite® CY 5622 is a hydrophobic cycloaliphatic epoxy formulation for hydrophobicity transfer and recovery in outdoor epoxy resin compositions. A hydrophobic cycloaliphatic epoxy formulation means that filler material has been pre-treated with a silane or a silane additive has been added to the composition.

The inorganic filler composition can be present in the polymer concrete electrical insulation system within the range of about 76% by weight to about 86% by weight, preferably within the range of about 80% by weight to about 85% by weight, preferably within the range of about 82% by weight to about 85% by weight, calculated to the total weight of the polymer concrete electrical insulation.

The inorganic filler with an average grain size within the range of 1 micron (μm) to 100 micron (μm) [component c(i)] can be present in an amount within the range of 22% to 42%, preferably within the range of, for example, 27% to 37%, and preferably at a concentration of about 32% by weight, calculated to the total weight of the polymer concrete electrical insulation.

The inorganic filler with an average grain size within the range of 0.1 mm to 2 mm [component c(ii)] can be present within the range of, for example, 41% to 61% by weight, preferably the lower limit is preferably 46%, and preferably about 51% by weight; and the upper limit is preferably 55% by weight, calculated to the total weight of the polymer concrete electrical insulation.

Whilst the total filler content is in the range of about, for example, 76% to about 86% by weight, calculated to the total weight of the polymer concrete, the component c(i) can be present in an amount within the range of 22% to 42%, preferably in an amount within the range of 27% to 37%, and the preferred values as given herein, calculated to the total weight of the polymer concrete electrical insulation The proportion of the inorganic filler of component c(ii) simply refers to the difference between the total amount of the filler content minus the amount of the filler of component c(i).

The uniform mixture of the inorganic filler composition can include as component c(i) an inorganic filler with an average grain size within the range of 1 micron (μm) to 100 micron (μm). This mineral filler [component c(i)] can preferably have an average grain size distribution within the range of 1 μm-90 μm. Preferably at least 70% of the particles have a particle size within the range indicated.

The inorganic filler with an average grain size within the range of 0.1 mm (100 micron) to 2 mm [component c(ii)] can preferably have an average grain size distribution within the range of 0.1 mm-1 mm, preferably within the range of 0.1 mm-0.7 mm. Preferably at least 70% of the particles have a particle size within the range indicated.

The mineral filler can preferably be selected from known filler materials as are used as fillers in electrical insulations. Preferably the filler can be selected from silica, quartz, known silicates, aluminium oxide, aluminium trihydrate [ATH], titanium oxide or dolomite [$CaMg(CO_3)_2$], metal nitrides, such as silicon nitride, boron nitride and aluminium nitride or metal carbides, such as silicon carbide. Preferred are silica and quartz with a minimum $SiO_2$-content of about 95-97% by weight. The surface of the filler material may have been surface treated in a manner known per se, for example with a compound selected from the group including silanes and siloxanes, preferably for example with 3-glycidoxypropyltrimethoxysilane or 3-glycidoxypropyldimethoxy-methylsilane.

The epoxy resin composition to be cured can include the epoxy resin, the hardener and the curing agent. Hardeners can be for example hydroxyl and/or carboxyl containing polymers such as carboxyl terminated polyester and/or carboxyl containing acrylate- and/or methacrylate polymers and/or carboxylic acid anhydrides. Useful hardeners can be further aliphatic, cycloaliphatic polycarbonic acids. Preferred anhydrides can be liquid cycloaliphatic anhydrides with a viscosity at 25° C. of about 70-80 mPa s. Such a liquid cycloaliphatic anhydride hardener can be for example Aradur® HY 1235 (Huntsman Advanced Materials Ltd.). The optional hardener can be used in concentrations within the range of 0.2 to 1.2, equivalents of hardening groups present, e.g. one anhydride group per 1 epoxide equivalent.

As optional additives, the composition can include further a curing agent (accelerant) for enhancing the polymerization of the epoxy resin with the hardener, at least one wetting/dispersing agent, flexibilizers, plasticizers, antioxidants, light absorbers, silicones, pigments, flame retardants and fibers and from further additives generally used in electrical applications.

Curing agents for enhancing the polymerization of the epoxy resin with the hardener are known per se, for example tertiary amines, such as benzyldimethylamine or amine-complexes such as complexes of tertiary amines with boron trichloride or boron trifluoride; urea derivatives, such as N-4-chlorophenyl-N', N'-dimethylurea (Monuron); optionally substituted imidazoles such as imidazole or 2-phenyl-imidazole. Preferred are tertiary amines. The amount of catalyst used can be a concentration of about 50-1000 ppm by weight, calculated to the composition to be cured.

Wetting/dispersing agents are known per se for example in the form of surface activators; or reactive diluents, preferably epoxy-containing or hydroxyl-containing reactive diluents; diepoxydes of glycols and of polyglycols, such as neopentylglycol-diglycidylether or trimethylolpropane-diglycidylether, or solvent-free low viscous polyols. Such wetting/dispersing agents can preferably be used in amounts of 0.5% to 1.0% based on the filler weight.

Plasticizers, antioxidants, light absorbers, as well as further additives used in electrical applications are known and are not critical.

For producing the exemplary polymer concrete electrical insulation as defined in the present disclosure, the filler material and the optional additives can be incorporated into the monomeric starting materials of the epoxy resin composition, optionally under vacuum, in any desired sequence, and curing the mixture by heating, using known methods. For this purpose component c(i) preferably can be uniformly mixed with the epoxy resin and component c(ii) with the hardener or vice versa. All the components can then be thoroughly mixed, adding also the additives, preferably at about room temperature (e.g., room temperature or slightly above room temperature), preferably under vacuum (at about 0.5 mbar to 5 mbar), so that the filler granules get completely wetted and the air can be removed.

The non-hardened epoxy resin composition thus obtained can, for example, be processed using known vacuum casting and/or automated pressure gelation (APG) manufacturing processes. A temperature of about 80-100° C. is recommended for known casting; a temperature of about 120-150° C. is recommended for automated pressure gelation (APG). The dispersion can be formed into the desired shape using known methods, optionally with the help of a molding tool, and then cured, preferably at a temperature of about 140° C., followed by optional post-curing. Optionally a vibrator may be mounted on the mould during casting to aid the removal of air and further reducing the void content of the final part.

The present disclosure also refers to an exemplary method of producing the exemplary polymer concrete electrical insulation as defined in the present disclosure, including: (i) the filler material can be incorporated into the monomeric starting materials of the epoxy resin composition using known methods so as to be uniformly dispersed therein; (ii) all the components can then be thoroughly mixed adding also the additives, preferably at room temperature or slightly above room temperature, preferably under vacuum, until the filler granules get completely wetted and the air is removed; (iii) the non-hardened epoxy resin composition thus obtained can be processed into a desired shape, optionally using a molding tool, subsequently cured, and optionally post-cured.

For incorporating the filler material into the monomeric starting materials of the epoxy resin composition according to step (i) above, preferably component c(i) can be uniformly mixed with the epoxy resin and component c(ii) with the hardener or vice versa.

Preferred uses of the exemplary polymer concrete electrical insulation system as defined in the present disclosure can be in power transmission and distribution applications, such as electrical insulations, especially in the field of impregnating electrical coils and in the production of electrical components such as transformers, embedded poles, bushings, high-voltage insulators for indoor and outdoor use, especially for outdoor insulators associated with high-voltage lines, as long-rod, composite and cap-type insulators, sensors, converters and cable end seals as well as for base insulators in the medium-voltage sector, in the production of insulators associated with outdoor power switches, measuring transducers, lead-throughs, and over-voltage protectors, in switchgear construction. The following examples illustrate the disclosure.

EXAMPLES 1-4

The epoxy resin compositions Examples 1 to 4 are made from the components as given in Table 1. The compositions can be prepared by thoroughly mixing the epoxy resin with the filler component c(i) and in a separate step mixing the hardener, the accelerator, and other additives and the filler component c(ii), and subsequently mixing all the components together in a thin film degassing mixer at a temperature of 40° C. The mixture can be processed by automated pressure gelation (APG) using a metallic mould. An existing steel APG mould for the manufacture of medium voltage outdoor insulators was modified by moving the position of the inlet from the bottom to the top of the mould and increasing its internal diameter. No temperatures (ca. 125° C.) or times in the manufacturing process were changed from those used to manufacture the same insulator with the 65% filled cycloaliphatic or hydrophobic cycloaliphatic epoxy. After injecting the formulation into the mould at a pressure of 1.5 bar, a post pressure of 5 bar was used to compact the material and compensate for curing shrinkage, as per the normal APG process. The post pressure was found to minimize the void content of the insulator. The composition can then be post-cured for ten hours at 140° C.

TABLE 1

|  | Ex. 1 | Ex. 2 | Ex. 3 | Ex. 4 |
|---|---|---|---|---|
| CY 184 (Resin) | 100 | 100 | 100 | 100 |
| HY1235(Hardener) | 90 | 90 | 90 | 90 |
| DY062 (Catalyst) | 0.54 | 0.54 | 0.54 | 0.54 |
| W12 EST (Filler) | 362 | 362 | 362 | 362 |
| Silica sand (0.5-1.0 mm) (Filler) | 580 |  |  |  |
| Sihelco 30 (0.3 mm)(Filler) |  | 580 | 680 | 790 |
| Z-6040 (Silane) | 2 | 2 | 2 | 2 |
| DW9134 (Pigment) | 2.7 | 2.7 | 2.7 | 2.7 |
| Total parts | 1137.24 | 1137.24 | 1237.24 | 1347.24 |
| Total filler content | 83% | 83% | 84% | 85.6% |

Araldite® CY 184: Cycloaliphatic epoxy resin (Huntsman)
Aradur®HY1235: modified cycloaliphatic anhydride (Huntsman)
Accelerator DY062: liquid tertiary amine
W12 EST: $SiO_2$-sand (Quarzwerke)
Sihelco 30: $SiO_2$-sand (Sihelco)
Z-6040: 3-glycidoxypropyltrimethoxysilane (Dow)

EXAMPLE 5

Formulation 5 uses a hydrophobic cycloaliphatic epoxy resin composition. The components as given in Table 2 were processed in an analogous manner as detailed in Example 1. Insulators were successfully manufactured by the APG process, using this formulation.

TABLE 2

|  | Example 5 |
|---|---|
| CY5622 (Resin) | 100 |
| HY1235 (Hardener) | 82 |
| DY062 (Catalyst) | 0.54 |
| W12EST (Filler) | 362 |
| Sihelco 30 (Filler) | 580 |
| Z-6040 (Silane) | 2 |
| DW9134 (Pigment) | 2.7 |
| Total parts | 1129.24 |
| Total filler content | 83% |

Araldite® CY 5622: modified hydrophobic cycloaliphatic epoxy resin (Huntsman)
Results
The compositions according to Examples 1 to 5 were tested and gave the following results:
The tracking and erosion resistance was tested at 4.5 kV and 6 kV, passing both. Arc resistance time was measured and was found to be between 240 and 255 seconds. Insulators were successfully manufactured by the APG process.

Insulators analogously made from cycloaliphatic epoxy resin compositions filled with 65% by weight of known silica filler material had an arc resistance of only 180-195 seconds (ASTM D495) and failed the tracking and erosion resistance at 4.5 kV and 6 kV class (IEC 60587).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Polymer concrete electrical insulation, comprising:
a hardened epoxy resin composition based on a cycloaliphatic epoxy resin and filled with about 76% by weight to about 86% by weight, based on the total weight of the polymer concrete electrical insulation, of (c) an electrically non-conductive inorganic filler composition, said (c) electrically non-conductive inorganic filler composition comprising a uniform mixture of c(i) an inorganic filler with an average grain size of 1 micron (µm) to 100 micron (µm) and c(ii) an inorganic filler with an average grain size of 0.7 mm (700 micron) to 2 mm;
wherein c(i) is present in an amount of 22% to 42% by weight, based on the total weight of the polymer concrete electrical insulation; and c(ii) is present in an amount of 41% to 61% by weight, based on the total weight of the polymer concrete electrical insulation.

2. Polymer concrete electrical insulation according to claim 1, wherein said hardened epoxy resin composition further comprises components selected from the group consisting of: wetting/dispersing agents, flexibilizers, plasticizers, antioxidants, light absorbers, silicones, pigments, flame retardants, fibers, and further additives used in electrical applications.

3. Polymer concrete electrical insulation according to claim 1, wherein c(i) is present in an amount of 27% to 37% by weight, based on the total weight of the polymer concrete electrical insulation.

4. Polymer concrete electrical insulation according to claim 1, wherein c(ii) is present in an amount of 46% to 55% by weight, based on the total weight of the polymer concrete electrical insulation.

5. Polymer concrete electrical insulation according to claim 1, wherein at least 70% of the particles in c(i) have a particle size of 1 µm to 90 µm.

6. Polymer concrete electrical insulation according to claim 1, wherein (c) the electrically non-conductive inorganic filler composition is selected from the group consisting of: silica, quartz, silicates, aluminium oxide, aluminium trihydrate [ATH], titanium oxide, dolomite [$CaMg(CO_3)_2$], metal nitrides, silicon nitride, boron nitride, aluminium nitride, metal carbides, and silicon carbide.

7. Polymer concrete electrical insulation according to claim 1, wherein (c) the electrically non-conductive inorganic filler composition is surface treated with a compound selected from the group consisting of silanes and siloxanes.

8. Polymer concrete electrical insulation according to claim 1, wherein the hardened epoxy resin composition is filled with about 80% by weight to about 85% by weight, based on the total weight of the polymer concrete electrical insulation, of (c) the electrically non-conductive inorganic filler composition.

9. Polymer concrete electrical insulation according to claim 1, wherein the hardened epoxy resin composition is filled with about 82% by weight to about 85% by weight, based on the total weight of the polymer concrete electrical insulation, of (c) the electrically non-conductive inorganic filler composition.

10. Polymer concrete electrical insulation according to claim 1, wherein c(i) is present in an amount of about 32% by weight, based on the total weight of the polymer concrete electrical insulation.

11. Polymer concrete electrical insulation system according to claim 1, wherein c(ii) is present in an amount of about 51% to 55% by weight, based on the total weight of the polymer concrete electrical insulation.

12. Electrical articles comprising the polymer concrete electrical insulation of claim 1.

* * * * *